(12) United States Patent
Bang et al.

(10) Patent No.: US 9,048,465 B2
(45) Date of Patent: Jun. 2, 2015

(54) BIPOLAR PLATE FOR A FUEL CELL COMPRISING A BY-PASSED SERPENTINE FLOW PATH FOR OXIDANT GAS; A COOLING PLATE FOR A FUEL CELL COMPRISING A BY-PASSED SERPENTINE FLOW PATH FOR COOLANT FLUID; FUEL CELL COMPRISING SUCH PLATES AND USES THEREOF

(75) Inventors: Mads Bang, Skørping (DK); Anders Risum Korsgaard, Aalborg (DK)

(73) Assignee: Serenergy A/S, Aalborg (DK)

( * ) Notice: Subject to any disclaimer, the term of this patent is extended or adjusted under 35 U.S.C. 154(b) by 591 days.

(21) Appl. No.: 12/452,702

(22) PCT Filed: Jul. 18, 2008

(86) PCT No.: PCT/DK2008/000273
§ 371 (c)(1),
(2), (4) Date: Feb. 4, 2010

(87) PCT Pub. No.: WO2009/010067
PCT Pub. Date: Jan. 22, 2009

(65) Prior Publication Data
US 2010/0136452 A1    Jun. 3, 2010

(30) Foreign Application Priority Data

Jul. 18, 2007    (DK) .................................. 2007 01063

(51) Int. Cl.
*H01M 2/38*      (2006.01)
*H01M 8/04*      (2006.01)
(Continued)

(52) U.S. Cl.
CPC ........ *H01M 8/04074* (2013.01); *H01M 8/0208* (2013.01); *H01M 8/0213* (2013.01);
(Continued)

(58) Field of Classification Search
USPC ......... 429/456, 457, 455, 514, 513, 512, 437, 429/434
See application file for complete search history.

(56) References Cited

U.S. PATENT DOCUMENTS 7,425,381 B2    9/2008 Gilman et al.
2002/0122970 A1    9/2002 Inoue
(Continued)

FOREIGN PATENT DOCUMENTS

CN    2643491    9/2004
CN    1788376    6/2006
(Continued)

OTHER PUBLICATIONS

James Larminie and Andrew Dicks, "Hydrogen Fuel Cells", Fuel Cell Systems Explained, Second Edition, pp. 1-24, 2003 John Wiley & Sons, Ltd.

*Primary Examiner* — Raymond Alejandro
(74) *Attorney, Agent, or Firm* — James Creighton Wray

(57) ABSTRACT

A bipolar plate for a fuel cell is provided. The bipolar plate having flow channels for oxidant gas; said flow channels for oxidant gas comprising one or more grooves each representing a serpentine path; wherein each said serpentine path independently comprises N consecutive legs $L_1, L_2, \ldots L_N$; connected to each other by N−1 consecutive turn sections, $T_1, T_2, \ldots T_{N-1}$; wherein each leg $L_1, L_2, \ldots L_{N-1}$ being lengthwise separated from its consecutive leg $L_2, L_3, \ldots L_N$ by a wall section, $W_1, W_2, \ldots W_{N-1}$; wherein each turn section representing a 180° change of flow direction of oxidant gas; wherein N is an odd integer of 3 or more; and wherein one or more of the wall sections $W_1, W_2, \ldots W_{N-1}$ independently comprise one or more by-pass channels for allowing oxidant gas to flow via a short cut from one leg $L_x$ to its consecutive leg $L_{x+1}$; 1≤x≤N−1; thereby by passing a part of the leg $L_x$ and a part of the leg $L_{x+1}$. Furthermore, a cooling plate having a similar design is provided. The bipolar plate as well as the cooling plate provide for more efficient supply of fluids over the surface of the plate.

23 Claims, 7 Drawing Sheets

(51) Int. Cl.
*H01M 8/02* (2006.01)
*H01M 8/24* (2006.01)

(52) U.S. Cl.
CPC ........... *H01M 8/0221* (2013.01); *H01M 8/0228* (2013.01); *H01M 8/0263* (2013.01); *H01M 8/241* (2013.01); *Y02E 60/50* (2013.01)

(56) References Cited

U.S. PATENT DOCUMENTS

2004/0112740 A1  6/2004  Shen et al.
2004/0209150 A1  10/2004  Rock et al.
2005/0079400 A1  4/2005  Sugiura

FOREIGN PATENT DOCUMENTS

| | | | |
|---|---|---|---|
| EP | 1302996 A2 | 4/2003 | |
| EP | 1498967 | 1/2005 | |
| FR | 2 891 090 | 3/2007 | |
| GB | 2178223 A | 2/1987 | |
| JP | 2001-126746 | * 5/2001 | ............. H01M 8/02 |
| JP | 2001126746 | 5/2001 | |
| JP | 2003100319 | 4/2003 | |
| JP | 2006351222 | 12/2006 | |
| WO | 2004102710 A1 | 11/2004 | |
| WO | WO 2007/088832 | 8/2007 | |

* cited by examiner

BIPOLAR PLATE FOR A FUEL CELL COMPRISING A BY-PASSED SERPENTINE FLOW PATH FOR OXIDANT GAS; A COOLING PLATE FOR A FUEL CELL COMPRISING A BY-PASSED SERPENTINE FLOW PATH FOR COOLANT FLUID; FUEL CELL COMPRISING SUCH PLATES AND USES THEREOF

This application claims the benefit of Danish Application No. PA 2007 01063 filed Jul. 18, 2007 and PCT/DK2008/000273 filed Jul. 18, 2008, and the amended sheets from the IPER, which are hereby incorporated by reference in their entirety.

FIELD OF THE INVENTION

The present invention relates to a bipolar plate for a fuel cell and a cooling plate for a fuel cell. Furthermore, the present invention relates to use of such plates for supplying oxygen to a cathode side and/or for cooling a cathode side of a fuel cell. The present invention furthermore relates to a method for the manufacture of such a bipolar plate or cooling plate as well as a fuel cell stack comprising such bipolar plate and/or cooling plate. Finally the present invention relates to a method for producing electrical power using such fuel cell stack and uses of such fuel cell stack as a back-up power system or as a continuous power generation system.

BACKGROUND OF THE INVENTION

The present invention relates to a bipolar plate for a fuel cell and a cooling plate for a fuel cell. The fuel cell bipolar plate according to the present invention has a cathode side and an anode side, wherein the cathode side comprises one or more flow channels in the form of serpentine grooves comprising by-pass channels. In analogy herewith, the cooling plate according to the present invention comprises a cooling side, wherein the cooling side comprises one or more flow channels in the form of serpentine grooves comprising by-pass channels. The bipolar plate and the cooling plate according to the present invention are particularly useful in the type of fuel cell stacks, wherein oxidant gas is used as reactant gas for operation of the fuel cells. Such fuel cell comprise inter alia PEM fuel cells and SOFC fuel cells.

Fuel cells are devices that provides for clean and relative efficient conversion of matter into electrical energy and heat. A range of different technologies have been developed within the last couple of decades, each employing its own principle, type of reactants, optimum operation conditions etc. One technology which has gained particular interest in recent years is the so-called PEM (proton exchange membrane) fuel cell. Another technology which has gained particular interest in recent years is the so-called SOFC (solid oxide fuel cell) fuel cell. The background of the present invention will know be explained in respect of a PEM fuel cell.

A PEM (proton exchange membrane) fuel cell comprises an anode and a cathode and a proton exchange membrane interposed there between. The proton exchange membrane comprises a catalyst on the side facing the anode as well as on the side facing the cathode. The principle of a PEM fuel cell is that supplying hydrogen to the side of the membrane facing the anode by virtue of the catalyst on the side of the membrane facing the anode results in the chemical reaction:

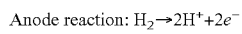  (1)

The anode is made of an electrically conducting material and thus transports the electrons generated on the anode side of the membrane, whereas the protons generated on the anode side of the PEM-membrane diffused through the membrane.

On the cathode side of the membrane oxygen (or air) is supplied. If an electrical load is connected between the cathode and the anode of the cell so as to form an electrical circuit, the electrons generated at the anode flows through this load to the cathode. The oxygen supplied to the cathode side of the membrane by virtue of the catalyst on the side of the membrane facing the cathode reacts with the protons which have diffused through the membrane and the electrons flowing to the cathode according to the following chemical equation:

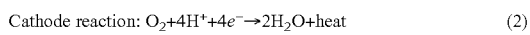  (2)

Hence, the net reaction taking place in a PEM fuel cell is:

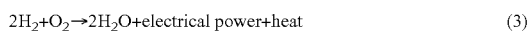  (3)

One single cell is capable of generating a voltage of typically 0.5-1V. In order to achieve higher voltages for fuel cells, a number of single cells are usually connected in series in a so-called fuel cell stack. A fuel cell stack is for the sake of economy often designed in a way that integrates the cathode of one fuel cell with the anode of an adjacent fuel cell of the corresponding stack. This is achieved by employing so-called bipolar plates. A bipolar plate is a plate which has two sides, one of which functions as an anode for one fuel cell, and the other of which functions as a cathode for the adjacent fuel cell in the corresponding fuel cell stack.

In order for a bipolar plate to be efficient, it must be assured that a constant supply of oxidant gas is delivered to the cathode side of the membrane and therefore also to the cathode side of the bipolar plate. Furthermore it must be assured that the oxidant gas supplied to the cathode side of the bipolar plate is distributed well over the surface of the cathode side of the bipolar plate. This in turn requires that oxidant gas is supplied at a relative high pressure from an outside source, such as the ambient air and into the inlet manifold connecting the cathode side of each bipolar plate of the fuel cell stack to the oxidant source.

On the basis of the above considerations much research and development of PEM fuel cells has in the recent years focused on the specific physical design of the fuel cell and in particularly on the physical design of the bipolar plates.

Due to the heat generated at the cathode of a fuel cell cooling means are needed to cool the cathode part of the fuel cell. In some designs of fuel cells the cathode side of the bipolar plate provides for supplying oxidant gas to the fuel cell as well as cooling the cathode side of the fuel cell by virtue of supplying more oxidant gas to the cathode side than is actually needed in relation to the stoichiometric amount of hydrogen being supplied and "consumed" at the anode side of the bipolar plate of the fuel cell. Other designs comprise distinct cooling plates which are not an integral part of the bipolar plate of the fuel cell.

French Patent application FR 2891090 discloses a fuel cell with bipolar plates having serpentine paths on their side. In order to press fluid through these channels, relatively high power consumption is used for pressing the gas through the channels, which is disadvantageously.

Japanese patent document JP 2003 100319 by Kino Yoshitaki assigned to Toyota Motor company discloses a fuel cell for low-temperature operation. The gas is moisture enriched in order to prevent too dry conditions for the membrane. The necessity for moisture implies a temperature below the boiling point. However, there is a certain risk that the channels of the cooling fluid are blocked with droplets from the moisture.

For this region, by pass channels are provide with a resin that swells with increasing degree of moisture. When the degree of moisture increases, the by pass channels are blocked, and the flow speed increases in the remaining channel which reduces the risk for droplet formation and consequential blocking of the channel. The disadvantage of such a system is the relatively high power consumption used for pressing the gas through the channels at high speed. Such resin-filled by-pass channels are not used for high temperature fuel cells, where the gas is dry and where uptake of moisture is not necessary.

By pass channels for preventing condensation or at least minimising the risk for flow reduction by condensation in low-temperature fuel cells are also disclosed in Japanese patent applications JP 2001 126746 and JP 2006 351222, in US patent application No. 2004 011274.0, and in International patent application Wo2007/088832.

Accordingly numerous different designs of bipolar plates have been disclosed in the art. However, although a substantial amount of these designs fulfil the technical requirement of supplying sufficient oxidant gas to the cathode side of such plates, they all suffer from the disadvantage that in respect of bipolar plates, the specific design requires much energy for supplying the oxidant gas from the outside source via the inlet manifold into the cathode side of the bipolar plates of the fuel cell stack; and in respect of cooling plates, the specific design requires much energy for supplying the coolant fluid from the outside source via the inlet manifold into the cooling side of the cooling plates of the fuel cell stack

OBJECT OF THE INVENTION

It is an object of the present invention to provide a bipolar plate for a fuel cell which overcomes the above disadvantage. Especially, it is an object of the invention to provide a cooling plate, for example in the form of a bipolar plate, which has an efficient cooling effect with minimized power consumption for transport of the cooling fluid, for example oxygen gas or air.

DESCRIPTION OF THE INVENTION

This purpose is achieved with a cooling plate with a cooling side and for use in a fuel cell stack; wherein
said cooling side having flow channels for coolant fluid;
said flow channels for coolant fluid comprising one or more grooves each representing a serpentine path; wherein
each said serpentine path independently comprises N consecutive legs $L_1, L_2, \ldots L_N$; connected to each other by N−1 consecutive turn sections, $T_1, T_2, \ldots T_{N-1}$; wherein
each leg $L_1, L_2, \ldots L_{N-1}$ being lengthwise separated from its consecutive leg $L_2, L_3, \ldots L_N$ by a wall section, $W_1, W_2, \ldots W_{N-1}$; wherein
each turn section representing a change, for example a 180° change, of flow direction of coolant fluid; wherein
N is an odd integer of 3 or more;
wherein one or more of the wall sections $W_1, W_2, \ldots W_N$ independently comprise one or more by-pass channels for allowing coolant fluid to flow via a shortcut from one leg $L_x$ to its consecutive leg $L_{x+1}$; $1 \leq x \leq N-1$; thereby bypassing a part of the leg $L_x$ and a part of the leg $L_{x+1}$.

This cooling plate or bipolar plate is highly suitable for high temperature fuel cells.

A cooling plate according to the invention can be provided in the form of a bipolar plate. Therefore, in a further aspect, the present invention relates to a bipolar plate for use in a fuel cell stack. The bipolar plate comprises an anode side and a cathode side; wherein
said cathode side having flow channels for oxidant gas;
said flow channels for oxidant gas comprising one or more grooves each representing a serpentine path; wherein
each said serpentine path independently comprises N consecutive legs $L_1, L_2, \ldots L_N$; connected to each other by N−1 consecutive turn sections, $T_1, T_2, \ldots T_{N-1}$; wherein
each leg $L_1, L_2, \ldots L_{N-1}$ being lengthwise separated from its consecutive leg $L_2, L_3, \ldots L_N$ by a wall section, $W_1, W_2, \ldots W_{N-1}$; wherein
each turn section representing a change, for example a 180° change, of flow direction of oxidant gas; wherein
N is an odd integer of 3 or more;
In addition, one or more of the wall sections $W_1, W_2, \ldots W_{N-1}$ independently comprise one or more by-pass channels for allowing oxidant gas to flow via a shortcut from one leg $L_x$ to its consecutive leg $L_{x+1}$; $1 \leq x \leq N-1$; thereby bypassing a part of the leg $L_x$ and a part of the leg $L_{x+1}$.

Because N is an odd integer of 3 or more, the cooling fluid exits the plate on an edge which is opposite to the edge, where the cooling fluid enters the plate. By this fact an optimised cooling effect is achieved, which is explained in the following. The cooling fluid with a low temperature and with a rather high speed enters the first leg $L_1$ of the serpentine channel at the upstream edge of the plate. Thus, the cooling fluid still has a low temperature when reaching the first turn $T_1$ of the serpentine channel. The by-pass channels being free from obstruction at all times reduce the flow speed of the cooling fluid such that the cooling fluid stays for a relatively long time near first turn $T_1$ for taking up substantial heat with a good cooling effect in this region at the first turn $T_1$. After the first turn $T_1$, the high temperature cooling fluid flows to the second turn $T_2$, for example at the upstream edge, where another heat exchange occurs, because the region at the second turn $T_2$ near the upstream edge has a lower temperature than the heated cooling fluid. The reduced temperature of the cooling fluid is used after another turn $T_2$ to cool the region near the downstream edge a second time before leaving the plate at the downstream edge. Instead of three legs with two turns, the serpentine channel may be provided with a higher number of legs, however, the number being an odd number in order to secure an exit of cooling fluid at the downstream edge opposite to the upstream edge, which implies an optimal cooling effect in contrast to the case, where the cooling fluid exits at the upstream edge after an even number of legs.

A non-limiting example of a scenario is described in the following for reason of illustration. For example, the cooling fluid enters the serpentine channel at the upstream edge with a temperature of 20° C. and is heated to 180° C. in the first turn $T_1$ in the region at the downstream edge. When returning again to the region at the upstream edge, the flow is reduced in the second turn $T_2$ with the speed-reducing, free-flow by pass channels such that heat is delivered to the region of the upstream edge by which the temperature of the cooling fluid is reduced to 160° C. When reaching the region at the downstream edge, the temperature of the cooling fluid is again raised to 180° C.

The directional change in a turn is of more than 90°, preferable more than 120° and most preferably more than 150°, for example 180°.

In a special embodiment, in order to even more efficiently cool the region at the downstream edge, one or more additional channels are provided at the downstream region through which the relatively cold cooling fluid flows for uptake of heat. These one or more additional channels extend from a downstream turn $T_i$, i being an odd integer, and to the downstream edge of the plate, where the cooling fluid exits the plate. Such additional channels are especially effective for cooling, if such additional channels are provided at the first turn $T_1$ where the temperature of the cooling fluid is still relatively low.

In a preferred embodiment, the cooling plate, for example in the form of a bipolar plate, has one or more of by-pass channels of wall section, $W_x$, located at the downstream half-part of the associated leg $L_x$ bypassing a part of the downstream section of leg $L_x$ and a part of the upstream section only of leg $L_{x+1}$. Thus, there are only bypass channels between downstream side of $L_x$ and upstream section of $L_{x+1}$ but no by-pass channels between upstream section of $L_x$ and downstream section of $L_{x+1}$. In other words, Wall section $W_1$ only has by-pass channels between downstream section of $L_1$ and upstream section of $L_2$. In this embodiment, there are no by-pass channels between upstream section of $L_1$ and downstream section of $L_2$. However, the wall section $W_2$ has by-pass channels between the downstream section of $L_2$ and the upstream section of $L_3$.

In a further aspect, the present invention relates to the use of a bipolar plate according to the present invention for supplying oxidant gas to the cathode side of a fuel cell during operation thereof.

In a further aspect, the present invention relates to the combined cooling of and supply of oxidant gas to the cathode side of a fuel cell during operation thereof.

In a further aspect, the present invention relates to the use of a cooling plate according to present invention for cooling the cathode side of a fuel cell during operation thereof.

In a further aspect, the present invention relates to a process for the manufacture of a bipolar plate and/or the cooling plate according to the invention.

In a further aspect the present invention relates to a fuel cell stack comprising more than one bipolar plate according to the present invention and/or comprising one or more cooling plates according to the present invention.

In a further aspect, the present invention relates to a method for the production of electric power and/or heat using a fuel cell stack according to the present invention In a further aspect, the present invention relates to the use of a fuel cell stack accord ing to the present invention as a back-up power system.

In a further aspect, the present invention relates to the use of fuel cell stack according to the present invention as continuous power generation system.

A further invention is provided by cooling plates or bipolar plates as described in the foregoing, where the additional channels are maintained, but the by-pass channels are avoided. Such a plate is described as a cooling plate for a fuel cell with a cooling side for providing a flow of a coolant fluid, and wherein said cooling side has flow channels for coolant fluid; said flow channels for coolant fluid comprising one or more grooves each representing a serpentine path; wherein each said serpentine path independently comprises N consecutive legs $L_1, L_2, \ldots L_N$; connected to each other by N−1 consecutive turn sections, $T_1, T_2, \ldots T_{N-1}$; wherein N is an odd integer of 3 or more.

each leg $L_1, L_2, \ldots L_{N-1}$ being lengthwise separated from its consecutive leg $L_2, L_3, \ldots L_N$ by a wall section, $W_1, W_2, \ldots W_{N-1}$; wherein each turn section representing a change of flow direction of coolant fluid; wherein the first turn section $T_1$ is connected to the edge of the plate by one or more additional channels for release of part of the cooling fluid through these one or more additional channels.

DESCRIPTION OF THE DRAWING

FIG. 1 shows three serpentine paths each comprising three legs, two turn sections and two wall sections.

The above FIGS. 1-4 are to be interpreted in such a way that the interior of each by-pass channel 16 is in fluid connection with the interior of the two legs of the serpentine between which the by-pass channel is arranged.

DETAILED DESCRIPTION OF THE INVENTION

The Bipolar Plate According to the Present Invention

Figure 1:
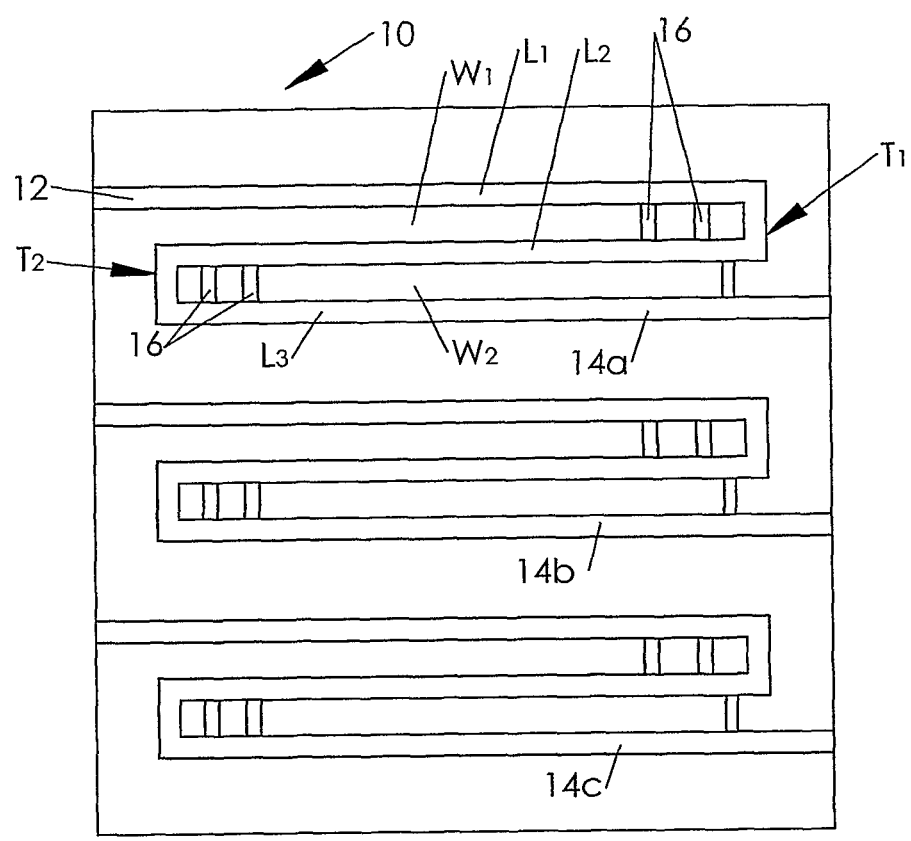
FIG. 1 is a plan view of the design of the serpentine paths of cathode side of a bipolar plate according to the present invention or the cooling side of a cooling plate according to the present invention.

FIG. 1 illustrates a cooling plate, for example a bipolar plate, according to the invention. As mentioned, it is an aspect the present invention to provide a bipolar plate for use in a fuel cell stack. The bipolar plate according to the present invention owing to its specific design of the cathode side provides for an efficient supply of oxidant gas from an outside source into the cathode side of each bipolar plate via an inlet manifold at a considerable reduced power consumption of the pump needed to perform this task.

The bipolar plate according to the first aspect of the present invention comprises an anode side and a cathode side; wherein said cathode side having flow channels for oxidant gas;
said flow channels for oxidant gas comprising one or more grooves 12 each representing a serpentine path 14;
wherein
each said serpentine path independently comprises N consecutive legs $L_1, L_2, \ldots L_N$; connected to each other by $N-1$ consecutive turn sections, $T_1, T_2, \ldots T_{N-1}$; wherein each leg $L_1, L_2 \ldots L_{N-1}$ being lengthwise separated from its consecutive leg $L_2, L_3, \ldots L_N$ by a wall section, $W_1$, $W_2, \ldots W_{N-1}$; wherein
each turn section representing a 180° change of flow direction of oxidant gas; wherein
N is an odd integer of 3 or more;
wherein one or more of the wall sections $W_1, W_2, \ldots W_{N-1}$ independently comprise one or more by-pass channels 16 for allowing oxidant gas to flow via a shortcut from one leg $L_x$ to its consecutive leg $L_{x+1}$; $1 \leq x \leq N-1$; thereby bypassing a part of the leg $L_x$ and a part of the leg $L_{x+1}$.

Due to the specific design of the flow channels for oxidant gas on the cathode side of the bipolar plate in the form of serpentine-shaped grooves comprising by-pass channels, an adequate supply of oxidant gas all over the cathode side of the bipolar plate is ensured at a considerably lower power consumption of the pump needed to pump the oxidant gas from an outside source to the cathode side of the bipolar plate via, an inlet manifold of the fuel cell stack. The reason for the lower power consumption of the pump is that the by-pass channels of the serpentine-shaped grooves provides for a smaller pressure drop through the cathode side of the bipolar plate, compared to a bipolar plate not having a design as the one according to the present invention.

Moreover it has been found that the presence of the by-pass channels in the bipolar plate according to the present invention provides for a cooling effect of the cathode side of the bipolar plate the magnitude of which is most surprising and which cannot be accounted for on the sole explanation of a reduced pressure drop in the flow channels. The nature of this cooling effect is not clearly understood, but it is believed that the by-pass channels create turbulence zones which increase the heat transfer near each end (or 180° bend). Hence thermal energy is efficiently transferred from one end of the plate to the other end using the heat capacity of the fluid. This enables a significant better temperature distribution over the plate, and consequently a better cooling effect. Due to the combined effects of cooling and reduced pressure drop of the bipolar plate according to the present invention, the specific design of the plate having serpentine flows comprising by-pass channels is also applicable for cooling plates for fuel cell stacks.

In the present description and the appended claims a serpentine shape is defined as a geometrical figure comprising three or more consecutive legs orientated essentially in the same direction, wherein each leg is connected to its consecutive leg with a 180° bend.

In the present description and the appended claims it is to understood that when referring to the serpentine leg $L_1$ and $L_N$, $L_1$ is always the upstream leg, i.e. the leg of the serpentine into which the oxidant gas enters the fuel cell, whereas $L_N$ is always the downstream leg, i.e. the leg of the serpentine from which the oxidant gas exits the fuel cell.

In a preferred embodiment according to the present invention, the cathode side of the bipolar plate according to the present invention comprises 5-20 serpentine paths 14, such as 6-18 serpentine paths, e.g. 8-16 serpentine paths, such as 9-15 serpentine paths, for example 10-14 serpentine paths, such as 11, 12 or 13 serpentine paths.

In a preferred embodiment of the bipolar plate according to the present invention one or more of the wall sections $W_1$, $W_2, \ldots W_{N-1}$ each independently comprises 1-15 by-pass channels, such as 2-14 by-pass channels, such as 3-13 by-pass channels, e.g. 4-12 by-pass channels, such as, 5-11 by-pass channels, for example 6-10 by-pass channels, e.g. 7, 8 or 9 by-pass channels. Such numbers of by-pass channels provide for efficient reduction in pressure drop and hence allow for more energy efficient supply of oxidant gas to the cathode side of the fuel cell.

Furthermore, it is believed that such numbers of by-pass channels provide for efficient turbulence of the flow of oxidant gas flowing in the serpentine which aids in cooling the cathode part of the fuel cell.

In another preferred embodiment of the bipolar plate according to the present invention, one or more of by-pass channels of wall section, $W_x$, is located at the downstream half-part of the associated leg $L_x$ thus bypassing a part of the downstream section of leg $L_x$ and a part of the upstream section of leg $L_{x+1}$. Such a design of the serpentine and associated by-pass channels have proven most efficient. For example, one or more of by-pass channels of wall section, $W_x$, is located at the downstream third of the associated leg $L_x$, thus bypassing a part of the downstream section of leg $L_x$ and a part of the upstream section of leg $L_{x+1}$. Thus, there are only bypass channels between downstream side of $L_x$ and upstream section of $L_{x+1}$ but no by-pass channels between upstream section of $L_x$ and downstream section of $L_{x+1}$. In other words, for a serpentine with three legs, $L_1, L_2, L_3$, wall section $W_1$ only has by-pass channels between downstream section of $L_1$ and upstream section of $L_2$ and there are no by-pass channels between upstream section of $L_1$ and downstream section of $L_2$. However, the wall section $W_2$ has by-pass channels between the downstream section of $L_2$ and the upstream section of $L_3$. This principle is easily extendible to serpentines with more than three legs.

Figure 2:
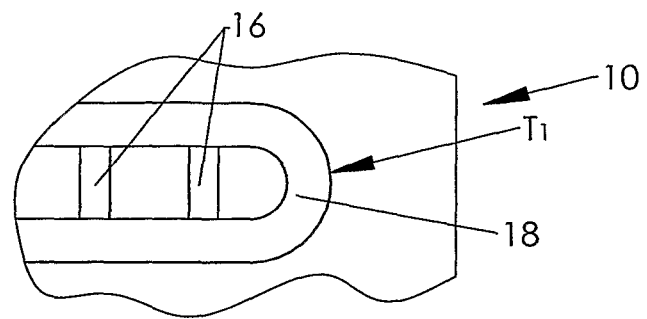
FIG. 2 is a plan view of part of the cathode side of a bipolar plate according to the present invention or the cooling side of a cooling plate according to the present invention showing a turn section in the form of a genuine 180° arch-type groove.

In one embodiment of the bipolar plate according to the present invention, one or more of the turn sections represents a genuine 180° change of flow direction in the form of a 180° arch-type groove, such a groove having a half-circle form. Such an embodiment is shown in part in FIG. 2. FIG. 2 shows two serpentine legs connected via a genuine 180° change of flow direction in the form of a 180° arch-type groove 18 having a half-circle form.

Figure 3:
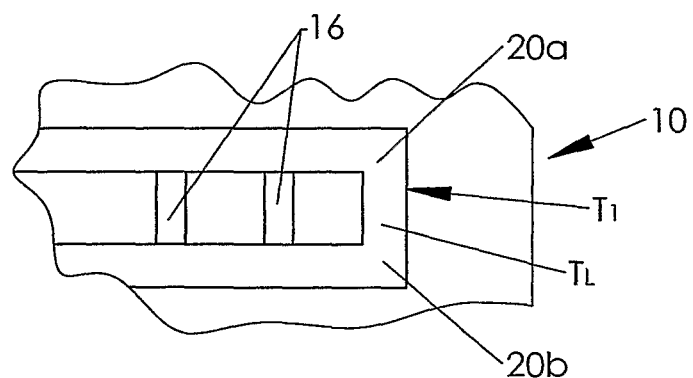
FIG. 3 is a plan view of part of the cathode side of a bipolar plate according to the present invention or the cooling side of a cooling plate according to the present invention showing a turn section in the form of a groove comprising two 90° bends separated by a short turn section leg, $T_L$.

In another embodiment of the bipolar plate according to the present invention, one or more of the turn sections represents two essentially 90° changes 20 in flow direction, each separated by an essentially straight turn section leg TL, so as to collectively represent a 180° change of flow direction. Such an embodiment is shown in part in FIG. 3. FIG. 3 shows two serpentine legs connected via a 180° change of flow direction in the form of two essentially 90° changes 20a,20b in flow direction In a preferred embodiment, the turn section leg TL has a length of not more than 20% of the length of any of the legs $L_1, L_2, \ldots L_{N-1}$ of the serpentine.

In a preferred embodiment of the bipolar plate according to the present invention, each serpentine path comprises 3 legs $L_1, L_2$ and $L_3$; 2 wall sections, $W_1$, $W_2$ and two turn sections, $T_1$ and $T_2$. Furthermore, in this design of the serpentine path of the bipolar plate of the present invention, it is preferred that the first wall section $W_1$ comprises by-pass channels located at the downstream half-part of $L_1$ and wherein the second wall section $W_2$ comprises by-pass channels located at the upstream half-part of and wherein the second wall section $W_2$ comprises by-pass channels located at the downstream half-part of $L_2$. In a yet more preferred embodiment of this design of the serpentine of the bipolar plate of the present invention, the first wall section $W_1$ comprises 10 by-pass channels located at the downstream half-part of $L_1$; the second wall section $W_2$ comprises 3 by-pass channels located at the upstream half-part of $L_2$; and the second wall section $W_2$ comprises 5 by-pass channels located at the downstream half-part of $L_2$.

In an alternative preferred embodiment of the bipolar plate according to the present invention, each serpentine path comprises 5 legs $L_1$, $L_2$, $L_3$, $L_4$ and $L_5$; 4 wall sections, $W_1$, $W_2$, $W_3$ and $W_4$ and four turn sections, $T_1$, $T_2$, $T_3$ and $T_4$.

It has been found that the number of bypass channels influences the pressure drop, temperature distribution and oxidant distribution. Generally the pressure drop is reduced when the number of bypass channels is increased. However the oxidant and temperature variation through the flow field is increased, putting a limit to how many and how large the bypass channels can be.

Each leg of each serpentine path may independently be more or less curved or may be essentially straight or may even be straight-lined.

It is preferred that neither one of the serpentine paths of the cathode side of the bipolar plate according to the present invention are "entangled" in any other serpentine path of the cathode side of the bipolar plate. By the term "not entangled" as used in the present description and the appended claims is meant that the each serpentine path of the cathode side of the bipolar plate according to the present invention takes up an area of the cathode surface of said plate which is complementary to the area of the cathode surface of said bipolar plate taken up by any of the other serpentine paths.

Figure 4:
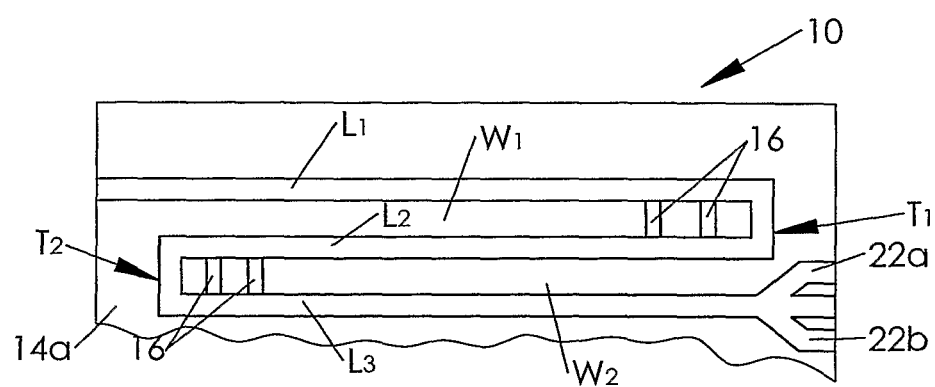
FIG. 4 is a plan view of part of the cathode side of a bipolar plate according to the present invention or part of the cooling side of a cooling plate according to the present invention showing one serpentine having three legs in which the last leg $L_3$ divides into three branches.

In one embodiment of the bipolar plate according to the present invention, the last leg $L_N$ of one or more of the serpentine paths at a position corresponding to the downstream part of said leg divides into two or more branches 22 each of which extends to the edge of said bipolar plate. Such a design provides for even more reduction of pressure loss through the serpentine paths and hence provides for better energy economy in terms of energy necessary for supplying the oxidant gas to the cathode part of the bipolar plate. This embodiment is shown in respect of a single serpentine path in FIG. 4. FIG. 4 shows a serpentine path of a plate 10, said serpentine path comprises three legs, $L_1$, $L_2$ and $L_3$, wherein $L_3$ divides into three branches at its end immediately prior to intersection with the edge of the plate.

The dimensions of each leg $L_1$, $L_2$, ... $L_N$ of each serpentine path may be chosen arbitrarily. However in one embodiment of the bipolar plate according to the present invention the area of the cross section of each leg $L_1$, $L_2$, ... $L_N$ of one or more of the serpentine paths are essential equal.

In another embodiment of the bipolar plate according to the present invention the widths of the each leg $L_1$, $L_2$, ... $L_N$ of one or more of the serpentine paths are essentially equal.

In yet another embodiment of the bipolar plate according to the present invention the ratio of the area of the cross section of any of the by-pass channels 16 to the area of the cross section of any of the leg $L_1$, $L_2$, ... $L_N$, independently is 0.1-1, such as 0.2-0.9, such as 0.3-0.8, e.g. 0.4-0.7, such as 0.5 or 0.6.

The by-pass channels present in one or more of the wall sections $W_1$, $W_2$, ... $W_{N-1}$ may be represented in any suitable pattern. It is preferable to group two or more by-pass channels in one or more distinct groups of by-pass channels. In such an embodiment it is preferred that the spacing between individual by-pass channels within each group is 1-8, such as 2-7, e.g. 3-6, such as 4 or 5 times the width of the legs $L_1$, $L_2$, ... $L_N$.

In a very special and preferred embodiment of the bipolar plate according to the present invention, the cathode side of the bipolar plate comprises 9 serpentine paths, wherein each serpentine path comprises 3 legs $L_1$, $L_2$ and $L_3$; 2 wall sections, $W_1$, $W_2$ and two turn sections, $T_1$ and $T_2$; wherein the first wall section $W_1$ comprises 10 by-pass channels located at the downstream half-part of $L_1$ and wherein the second wall section $W_2$ comprises 3 by-pass channels located at the upstream half-part of $L_2$, and wherein the second wall section $W_2$ comprises 5 by-pass channels located at the downstream half-part of $L_2$. In this embodiment it is preferred that the last leg $L_N$ of one or more of the serpentine paths at a position corresponding to the downstream part of said leg divides into two or more branches 22 each of which extends to the edge of said bipolar plate.

In a preferred embodiment, the bipolar plate according to the present invention is adapted so as to be suitable for use in a PEM fuel cell or a SOFC fuel cell.

The Cooling Plate According to the Present Invention

In a second aspect, the present invention provides a cooling plate for use in a fuel cell stack. The cooling plate according to the present invention, owing to its specific design of its cooling side provides for an efficient supply of coolant fluid from an outside source into its cooling side via an inlet manifold at a considerable reduced power consumption of the pump needed to perform this task.

As illustrated in FIG. 1, the cooling plate according to the first aspect of the present invention comprises an cooling side; wherein said cooling side having flow channels for coolant fluid; said flow channels for coolant fluid comprising one or more grooves 12 each representing a serpentine path 14; wherein each said serpentine path independently comprises N consecutive legs $L_1$, $L_2$, ... $L_N$; connected to each other by N-1 consecutive turn sections, $T_1$, $T_2$, ... $T_{N-1}$; wherein each leg $L_1$, $L_2$, ... $L_{N-1}$ being lengthwise separated from its consecutive leg $L_2$, $L_3$, ... $L_N$ by a wall section, $W_1$, $W_2$, ... $W_{N-1}$; wherein each turn section representing a change, for example 180° change, of flow direction of coolant fluid; wherein N is an odd integer of 3 or more;

wherein one or more of the wall sections $W_1$, $W_2$, ... $W_{N-1}$ independently comprise one or more by-pass channels 16 for allowing coolant fluid to flow via a shortcut from one leg $L_x$ to its consecutive leg $L_{x+1}$; $1 \le x \le N-1$; thereby bypassing a part of the leg $L_x$ and a part of the leg $L_{x+1}$.

Due to the specific design of the flow channels for coolant fluid on the cooling side of the cooling plate in the form of serpentine-shaped grooves comprising by-pass channels, an adequate supply of coolant fluid all over the cooling side of the cooling plate is ensured at a considerably lower power consumption of the pump needed to pump the coolant fluid from an outside source to the cooling side of the cooling plate via an inlet manifold of the fuel cell stack. The reason for the lower power consumption of the pump is that the by-pass channels of the serpentine-shaped grooves provides for a smaller pressure drop through the cooling side of the cooling plate, compared to a cooling plate not having a design as the one according to the present invention.

As disclosed above in respect of the by-pass channels of the serpentine paths of the bipolar plate, the by-pass channels provides for a surprisingly large cooling effect. The same effect applies in respect of the serpentine path of a cooling plate according to the present invention.

In the present description and the appended claims it is to understood that when referring to the serpentine leg $L_1$ and $L_N$, $L_1$ is always the upstream leg, i.e. the leg of the serpentine into which the coolant fluid enters the fuel cell, whereas $L_N$ is always the downstream leg, i.e. the leg of the serpentine from which the coolant fluid exits the fuel cell.

In a preferred embodiment according to the present invention, the cooling side of the cooling plate according to the present invention comprises 5-20 serpentine paths 14, such as 6-18 serpentine paths, e.g. 8-16 serpentine paths, such as 9-15 serpentine paths, for example 10-14 serpentine paths, such as 11, 12 or 13 serpentine paths.

In a preferred embodiment of the cooling plate according to the present invention one or more of the wall sections $W_1$, $W_2, \ldots W_{N-1}$ each independently comprises 1-15 by-pass channels, such as 2-14 by-pass channels, such as 3-13 by-pass channels, e.g. 4-12 by-pass channels, such as, 5-11 by-pass channels, for example 6-10 by-pass channels, e.g. 7, 8 or 9 by-pass channels. Such numbers of by-pass channels provide for efficient reduction in pressure drop and hence allows for more energy efficient supply of coolant fluid to the cooling side of cooling plate of the fuel cell. Furthermore, such numbers of by-pass channels provide for efficient turbulence of the flow of coolant fluid flowing in the serpentine which furthermore aids in efficient cooling.

In another preferred embodiment of the cooling plate according to the present invention, one or more of by-pass channels of wall section, $W_x$, is located at the downstream half-part of the associated leg $L_x$ thus bypassing a part of the downstream section of leg $L_x$ and a part of the upstream section of leg $L_{x+1}$. Such a design of the serpentine and associated by-pass channels have proven most efficient. It is more preferred that one or more of by-pass channels of wall section, $W_x$, is located at the downstream third of the associated leg $L_x$, thus bypassing a part of the downstream section of leg $L_x$ and a part of the upstream section of leg $L_{x+1}$.

In one embodiment of the cooling plate according to the present invention, one or more of the turn sections represents a genuine 180° change of flow direction in the form of a 180° arch-type groove, such a groove having a half-circle form. Such an embodiment is shown in part in FIG. 2. FIG. 2 shows two serpentine legs connected via a genuine 180° change of flow direction in the form of a 180° arch-type groove 18 having a half-circle form.

In another embodiment of the cooling plate according to the present invention, one or more of the turn sections represents two essentially 90° changes 20 in flow direction, each separated by an essentially straight turn section leg TL, so as to collectively represent a 180° change of flow direction. Such an embodiment is shown in part in FIG. 3. FIG. 3 shows two serpentine legs connected via a 180° change of flow direction in the form of two essentially 90° changes 20a,20b in flow direction In a preferred embodiment, the turn section leg TL has a length of not more than 20% of the length of any of the legs $L_1, L_2, \ldots L_{N-1}$ of the serpentine.

In a preferred embodiment of the cooling plate according to the present invention, each serpentine path comprises 3 legs $L_1$, $L_2$ and $L_3$; 2 wall sections, $W_1$, $W_2$ and two turn sections, $T_1$ and $T_2$. Furthermore, in this design of the serpentine path of the cooling plate of the present invention, it is preferred that the first wall section $W_1$ comprises by-pass channels located at the downstream half-part of $L_1$ and wherein the second wall section $W_2$ comprises by-pass channels located at the upstream half-part of $L_2$, and wherein the second wall section $W_2$ comprises by-pass channels located at the downstream half-part of $L_2$. In a yet more preferred embodiment of this design of the serpentine of the cooling plate of the present invention, the first wall section $W_1$ comprises 10 by-pass channels located at the downstream half-part of $L_1$; the second wall section $W_2$ comprises 3 by-pass channels located at the upstream half-part of $L_2$; and the second wall section $W_2$ comprises 5 by-pass channels located at the downstream half-part of $L_2$.

In an alternative preferred embodiment of the cooling plate according to the present invention, each serpentine path comprises 5 legs $L_1$, $L_2$, $L_3$, $L_4$ and $L_5$; 4 wall sections, $W_1$, $W_2$, $W_3$ and $W_4$ and four turn sections, $T_1$, $T_2$, $T_3$ and $T_4$.

It has been found that the number of bypass channels influences the pressure drop, temperature distribution and coolant distribution. Generally the pressure drop is reduced when the number of bypass channels is increased. However the coolant and temperature variation through the flow field is increased, putting a limit to how many and how large the bypass channels can be.

Each leg of each serpentine path may independently be more or less curved or may be essentially straight or may even be straight-lined.

It is preferred that neither one of the serpentine paths of the cooling side of the cooling plate according to the present invention are "entangled" in any other serpentine path of the cooling side of the cooling plate. By the term "not entangled" as used in the present description and the appended claims is meant that the each serpentine path of the cooling plate according to the present invention takes up an area of the cooling surface of said plate which is complementary to the area of the cooling surface of said cooling plate taken up by any of the other serpentine paths.

In one embodiment of the cooling plate according to the present invention, the last leg $L_N$ of one or more of the serpentine paths at a position corresponding to the downstream part of said leg divides into two or more branches 22 each of which extends to the edge of said cooling plate. Such a design provides for even more reduction of pressure loss through the serpentine paths and hence provides for better energy economy in terms of energy necessary for supplying the coolant fluid to the cooling part of the cooling plate. This embodiment is shown in respect of a single serpentine path in FIG. 4. FIG. 4 shows a serpentine path of a plate 10, said serpentine path comprises three legs, $L_1$, $L_2$ and $L_3$, wherein $L_3$ divides into three branches at its end immediately prior to intersection with the edge of the plate.

The dimensions of each leg $L_1, L_2, \ldots L_N$ of each serpentine path may be chosen arbitrarily. However in one embodiment of the cooling plate according to the present invention the area of the cross section of each leg $L_1, L_2, \ldots L_N$ of one or more of the serpentine paths are essential equal.

In another embodiment of the cooling plate according to the present invention the widths of the each leg $L_1, L_2, \ldots L_N$ of one or more of the serpentine paths are essentially equal.

In yet another embodiment of the cooling plate according to the present invention the ratio of the area of the cross section of any of the by-pass channels 16 to the area of the cross section of any of the leg $L_1, L_2, \ldots L_N$, independently is 0.1-1, such as 0.2-0.9, such as 0.3-0.8, e.g. 0.4-0.7, such as 0.5 or 0.6.

The by-pass channels present in one or more of the wall sections $W_1, W_2, \ldots W_{N-1}$ may be represented in any suitable pattern. It is preferable to group two or more by-pass channels in one or more distinct groups of by-pass channels. In such an embodiment it is preferred that the spacing between individual by-pass channels within each group is 1-8, such as 2-7, e.g. 3-6, such as 4 or 5 times the width of the legs $L_1, L_2, \ldots L_N$.

In a very special and preferred embodiment of the cooling plate according to the present invention, the cooling side of the cooling plate comprises 9 serpentine paths, wherein each serpentine path comprises 3 legs $L_1$, $L_2$ and $L_3$; 2 wall sections, $W_1$, $W_2$ and two turn sections, $T_1$ and $T_2$; wherein the first wall section $W_1$ comprises 10 by-pass channels located at the downstream half-part of $L_1$ and wherein the second wall section $W_2$ comprises 3 by-pass channels located at the upstream half-part of $L_2$, and wherein the second wall section $W_2$ comprises 5 by-pass channels located at the downstream half-part of $L_2$. In this embodiment it is preferred that the last leg $L_N$ of one or more of the serpentine paths at a position corresponding to the downstream part of said leg divides into two or more branches 22 each of which extends to the edge of said cooling plate.

In a preferred embodiment, the cooling plate according to the present invention is adapted so as to be suitable for use in a PEM fuel cell or a SOFC fuel cell.

Uses of a Bipolar Plate or a Cooling Plate According to the Present Invention

In a third aspect, the present invention relates to the use of a bipolar plate according to the present invention for supplying oxidant gas to the cathode side of a fuel cell during operation thereof.

In a fourth aspect, the present invention relates to the combined cooling of and supply of oxidant gas to the cathode side of a fuel cell during operation thereof. Such effect combined cooling and supply of oxidant gas to the cathode side of the fuel cell is achieved by incorporating into the fuel cell a bipolar plate according to the present invention and supplying to the cathode side of the bipolar plate through the serpentine paths more oxidant gas than is need in accordance with the stoichiometric amount of hydrogen gas associated with the reaction on the anode side of the bipolar plate.

In a fifth aspect, the present invention relates to the use of a cooling plate according to present invention for cooling the cathode side of a fuel cell during operation thereof. In this aspect of the present invention it is preferred to use a cooling fluid in the form of a liquid, such as water, alcohols or oils or in the form of a gas or a mixture of gases, such as atmospheric air, oxygen, nitrogen, methane, reformate gas, or other gases, preferably inert gases.

The Process for the Manufacture of the Bipolar Plate or the Cooling Plate According to the Present Invention The bipolar plate and the cooling plate according to the present invention may be of any suitable material. It is an essential feature that the material of the bipolar plate and the cooling plate is electrical conductive and that it is corrosive resistant. A suitable material may be selected from the group comprising: graphite; graphite powder comprising a binder; a metal; a metal comprising a corrosion resistant coating; an alloy; an alloy comprising a corrosion resistant coating; an electrically conducting elastomeric mixture, an electrically conductive ceramic material.

In a sixth aspect, the present invention relates to a process for the manufacture of a bipolar plate and/or the cooling plate according to the invention.

The bipolar plate and the cooling plate according to the present invention may be manufactured by techniques known to be conventional in the art. In a preferred embodiment according to the method for the preparation of a bipolar plate or the cooling plate according to the present invention, the bipolar plate/cooling plate is produced by the following steps:
i) provision of a material having dimensions which at least corresponding to the desired design of the bipolar plate/cooling plate;
ii) provision of the details of the desired design by milling off excessive material, e.g. in a CNC milling machine;
iii) optionally coating the plate with a corrosion resistant coating.

In another preferred embodiment according to the method for the preparation of a bipolar plate or a cooling plate according to the present invention, the bipolar plate or cooling plate is produced by the following steps:
i) provision of a material suitable for moulding and/or casting;
ii) casting the material into the desired design of the bipolar plate/cooling plate;
iii) optionally coating the plate with a corrosion resistant coating.

The Fuel Cell Stack According to the Present Invention

In a seventh aspect the present invention relates to a fuel cell stack comprising more than one bipolar plate according to the present invention and/or comprising one or more cooling plates according to the present invention. A person skilled in the art will know how to assemble and operate such a fuel cell stack.

In a preferred embodiment according to this aspect of the present invention, fuel cell stack is a PEM fuel cell stack or a SOFC fuel cell stack.

A Method for the Production of Electrical Power and/or Heat Using a Fuel Cell Stack According to the Present Invention In an eighth aspect, the present invention relates to a method for the production of electric power and/or heat using a fuel cell stack according to the present invention Uses of a Fuel Cell According to the Present Invention In a ninth aspect, the present invention relates to the use of a fuel cell stack according to the present invention as a backup power system.

In a tenth aspect, the present invention relates to the use of fuel cell stack according to the present invention as a continuous power generation system.

Example 1

This example illustrates the difference between a plate having serpentine path comprising by-pass channels and a similar plate without by-pass channels in respect of energy consumption of supplying an oxidant flow through the serpentine. The plate had in each case a serpentine path comprising three legs, $L_1$, $L_2$ and $L_3$, and two wall sections $W_1$ and $W_2$. The channel dimensions of $L_1$, $L_2$ and $L_3$ were 1.5 mm wide and 1.8 mm high. In respect of the serpentine path comprising by-pass channels, the first wall section $W_1$ comprised 10 by-pass channels located in the downstream half-part of $L_1$; the second wall section $W_2$ comprised three by-pass channels located in the upstream third-part of $L_2$, and the second wall section $W_2$ furthermore comprised five by-pass channels located in the downstream third-part of $L_2$.

Oxidant gas was supplied to each of the two plates. The velocity of oxidant gas was calculated at 20° C. The input thermal power the cell was controlled such that the outlet temperature was 180° C. at a load ranging up to 0.7 A/cm$^2$ giving a cell voltage of 0.45 V. The active area that the channel covers is approximately 5 cm$^2$.

Figure 5:
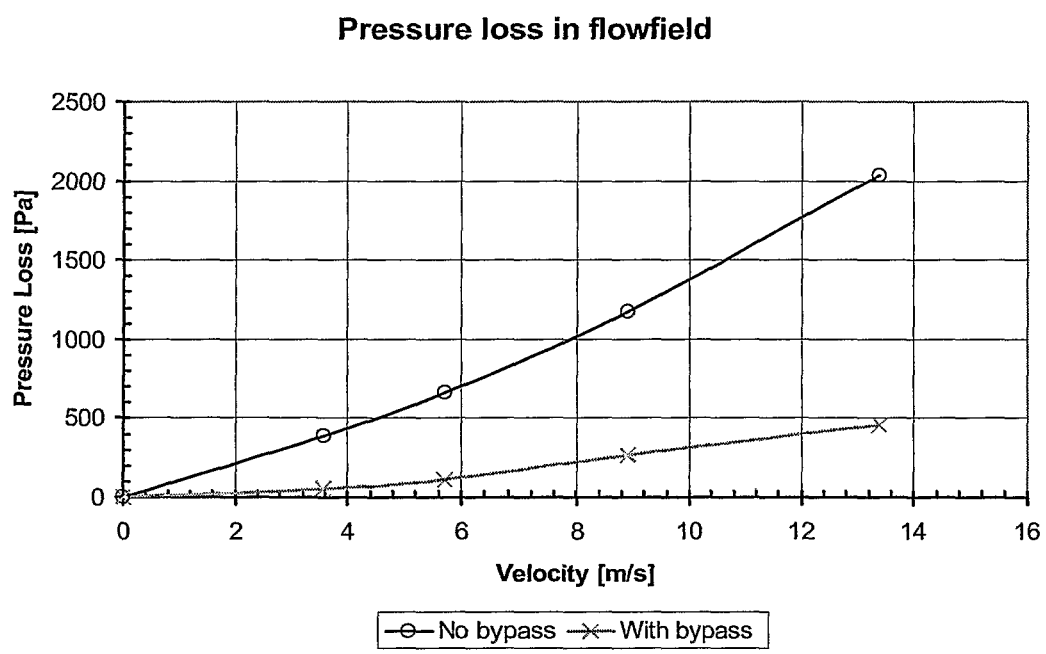
FIG. 5 shows a plot of the pressure loss in a single serpentine channel comprising three legs versus the fluid velocity in the inlet section of the first leg in respect of a serpentine comprising no by-pass channels compared to a serpentine comprising by-pass channels according to example 1.

FIG. 5 shows a plot of the pressure loss in a single serpentine channel comprising three legs versus the fluid velocity in the inlet section of the first leg in respect of a serpentine comprising no by-pass channels compared to a serpentine comprising the by-pass channels.

As the pressure loss using the bypass channel has been reduced by a factor of 4 as shown in the graph, so is the theoretical power consumption. For practical systems this mean that the parasitic power loss with bypass channels can be reduced to less than 2% of the fuel cell stack output at full load.

Figure 6:
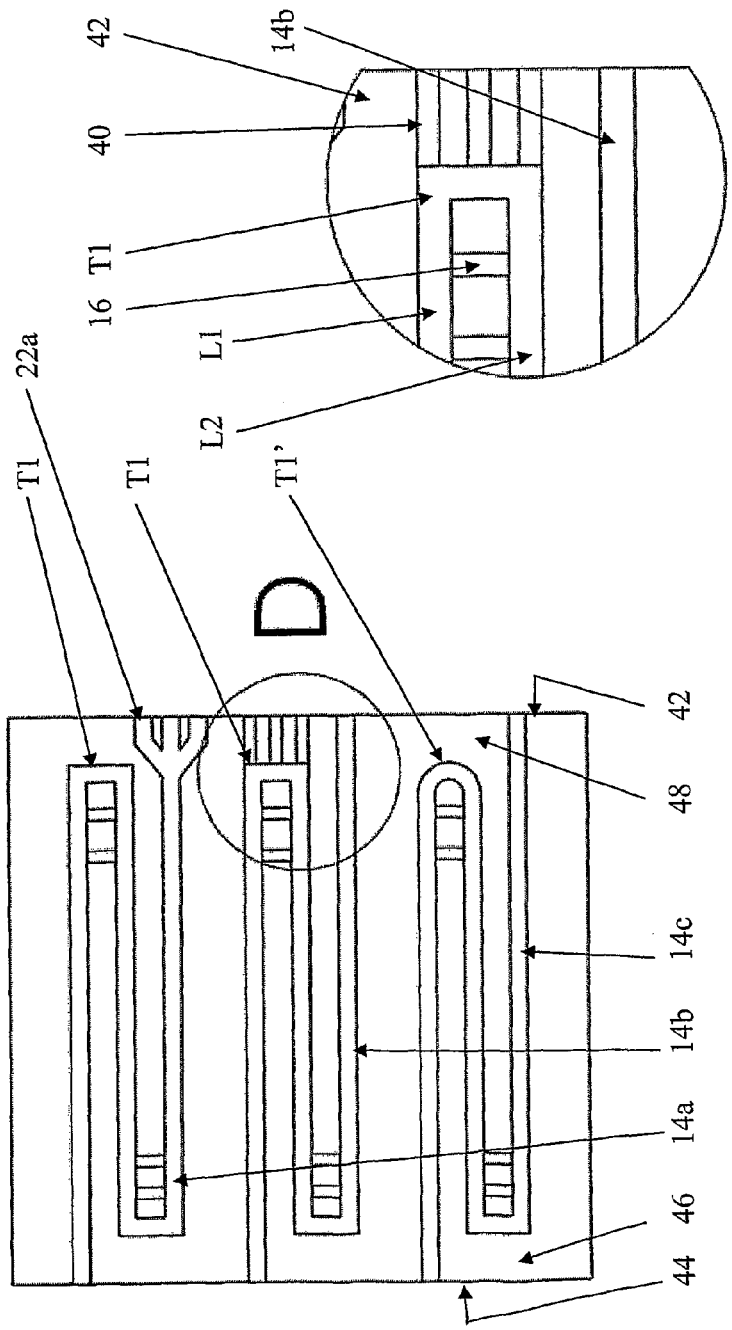
FIG. 6 illustrates an alternative design of a cooling plate or bipolar plate, where addition channels are provided from the downstream turn and the downstream edge for cooling of the downstream region near the downstream edge.

FIG. 6 illustrates an alternative embodiment for a bipolar plate or cooling plate according to the invention. For reason of illustration, there are shown three different serpentine channel patterns running from an upstream edge 44 of the plate, where cooling fluid enters, to an opposite, downstream edge 42 of the plate 10, where the cooling fluid exits. Typically, only one of the patterns will be used repeatedly over one side or both sides of the plate. The first channel pattern 14a and the second channel pattern 14b have a square $T_1$ turn with two 90 degrees turns, whereas the third turn is a half circle.

The second channel pattern 14b is provided with additional exit channels 40 extending from one or more turn sections $T_i$ to the downstream edge 42 in order to cool the region 48 at the downstream edge 42. Only a predetermined part of the cooling fluid exits the channel pattern 14b through the additional exit channels, which is dependent on the dimensioning of the additional exit channels relative to the serpentine channel 14b and the by pass channels 16.

The flow of the cooling fluid, typical gas, is explained in the following. The cooling with a low temperature fluid enters the first leg $L_1$ of the serpentine channel 14b at the upstream edge 44 with a rather high speed. Thus, the cooling fluid still has a low temperature when reaching the first turn $T_1$ of the serpentine channel 14b. The by pass channels 16 reduce the flow speed of the cooling fluid such that the cooling fluid stays relatively long time near the downstream edge 42 for taking up substantial heat with a good cooling effect in this region 48 at the downstream edge 42.

A non-limiting example of a scenario is described in the following for reason of illustration. For example, the cooling fluid enters the serpentine channel 14b at the upstream edge 44 with a temperature of 20° C. and is heated to 180° C. in the first turn $T_1$ in the region 48 at the downstream edge 42. When returning again to the region 46 at the upstream edge 44, the flow is reduced in the second turn $T_2$ with the speed-reducing by pass channels 16 such that heat is delivered to the region 46 of the upstream edge 44 by which the temperature of the cooling fluid is reduced to 160° C. When reaching the region 48 at the downstream edge 42, the temperature of the cooling fluid is again raised to 180° C. In order to cool the region 48 at the downstream edge 42, additional channels 40 are provided at the downstream region 48 through which the relatively cold cooling fluid flows for uptake of heat. Such channels 40 are especially effective for cooling, if such additional channels 40 are provided at the first turn $T_1$, where the temperature of the cooling fluid is still relatively low.

Figure 7A:
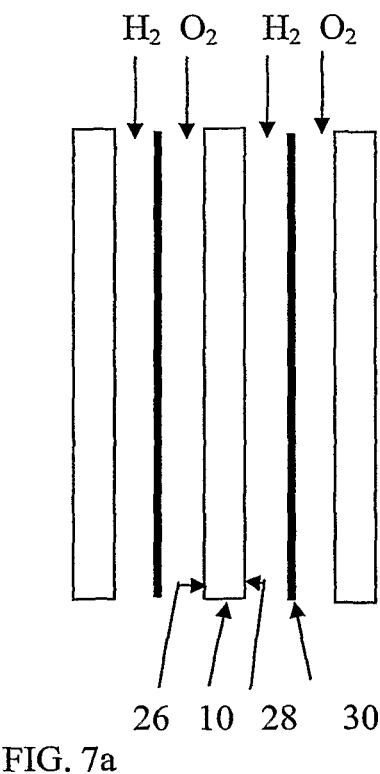
FIG. 7 a) illustrates a first fuel cell stack principle, where a bipolar plate is used between electrolytic membranes; b) illustrates a second fuel cell stack principles, where and anode plate and a cathode plate are oriented back-to-back with a cooling section between the anode plate and the cathode plate, c) illustrates a third fuel cell stack principle, where a cooling plate is sandwiched between a cathode plate and an anode plate and cooling is provided in the volume between the cooling plate and the anode plate and in the volume between the cooling plate and the cathode plate.

FIG. 7a illustrates a first configuration for part of a fuel cell stack. The configuration comprises a bipolar plate 10 with an anode side 28 on which hydrogen flow is provided for donating protons to the electrolytic membrane 30 and with a cathode side 26 on which oxygen or air or other fluid flows for accepting protons from the membrane 30. The cathode fluid, for example oxygen or air is used as a cooling medium for cooling the bipolar plate. The cathode side of the bipolar plate is provided with a serpentine channel pattern as described above.

Figure 7B:
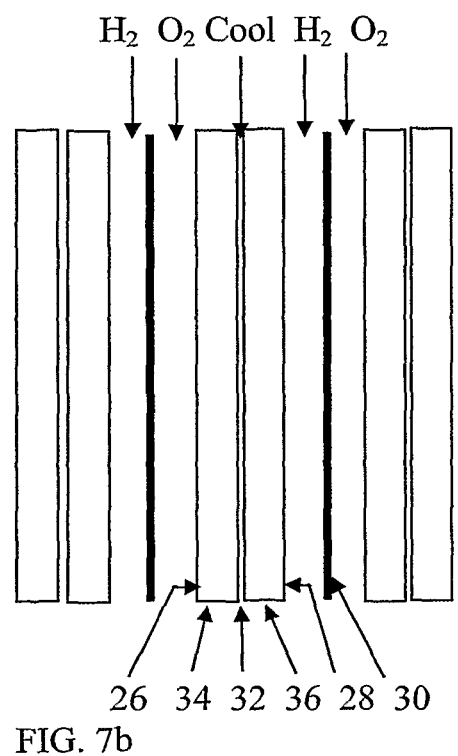

FIG. 7b illustrates an alternative embodiment, where a cathode plate 34 with a cathode side 26 is combined with an anode plate 36 with a anode side 28 and with cooling fluid 32, for example gas or liquid in a space 32 between the two plates. In the space 32 cathode plate 34 or the anode plate 36 are provided with a serpentine channel pattern as described above for efficient cooling by the cooling fluid.

Figure 7C:
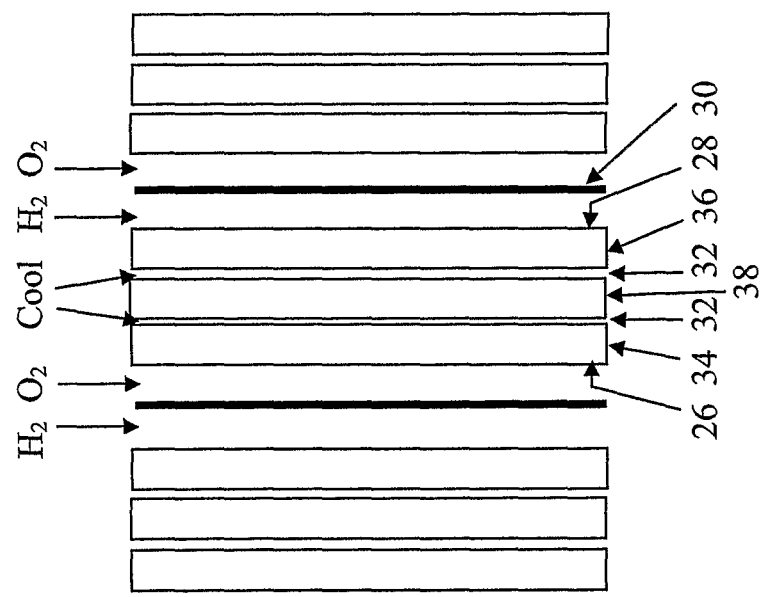

FIG. 7c is a further alternative, where a cathode plate 34 and an anode plate 36 are sandwiching a cooling plate 38 such that two cooling spaces 32 are provided, one cooling volume between the cooling plate 38 and the cathode plate 34 and another cooling volume between the cooling plate 38 and the anode plate 36. The cooling plate 38 is provided with a serpentine channel pattern as described above on both of its sides.

The invention claimed is:

1. A fuel cell comprising a cooling plate (10) having a cooling side configured to provide a flow of a coolant fluid through a serpentine path:
    said cooling side having flow channels for coolant fluid;
        said flow channels for coolant fluid comprising grooves (12) forming the serpentine path (14); wherein
    each said serpentine path independently comprises a number N of consecutive legs, wherein N is an odd integer of 3 or more; wherein each leg is connected to the following leg by a turn section, such that the number N of consecutive legs are connected by N−1 consecutive turn sections; such that the first leg is connected to the second leg by the first turn section, and the second leg is connected to the third leg by a second turn section, and so forth in case of more than 3 legs; wherein
    each leg is lengthwise separated from its consecutive leg by a wall section; such that the first leg $L_1$ is separated from the second leg $L_2$ by a first wall section $W_1$ and the third leg $L_3$ is separated from the second leg $L_2$ by a second wall section $W_2$, and so forth in case of more than 3 legs; wherein
    each turn section represents a change of flow direction of coolant fluid from one leg to a consecutive leg;
    wherein one or more of the wall sections independently comprise one or more bypass channels for allowing coolant fluid to flow via a shortcut from one leg to its consecutive leg; thereby bypassing a part of the leg and a part of the consecutive leg;
    the bypass channels are obstruction-free, and N is an odd integer of 3 or more; and
    wherein the fuel cell is a high temperature fuel cell;
    wherein the fuel cell comprises a first cooling plate (34), which is a cathode plate and not a bipolar plate, the first cooling plate (34) having a first cooling side and an opposite cathode side (26), and a second cooling plate (36), which is an anode plate and not a bipolar plate, the second cooling plate (36) having a second cooling side and an opposite anode side (28), wherein
    either the anode plate and the cathode plate are oriented back-to-back with a cooling section between the anode plate and the cathode plate, such that the first cooling side and the second cooling side are facing each other and cooling fluid is provided in a space (32) between the first and the second cooling sides of the two plates;
    or the first and the second cooling sides are sandwiching a cooling plate (38) in between such that two cooling spaces (32) are provided, one cooling space (32) between the cooling plate (38) and the first cooling side of the cathode plate (34) and another cooling space (32) between the cooling plate (38) and the second cooling side of the anode plate (36).

2. A fuel cell according to claim 1, wherein the change of flow direction in each turn section is a 180° turn.

3. A fuel cell according to claim 1, wherein the cooling side comprises 5-20 serpentine paths (14).

4. A fuel cell according to claim 1, wherein one or more of the wall sections each independently comprises 2-14 bypass channels.

5. A fuel cell according to claim 1, wherein each leg has an upstream half-part and a downstream half-part, wherein one or more of the bypass channels in wall section is provided between the downstream half-part of one leg and the upstream half of the consecutive leg, wherein no bypass channels are provided between the upstream half part of leg and the downstream half part of the consecutive leg.

6. A fuel cell according to claim 1, wherein one or more of the turn sections is shaped as 180° arch for a 180° change of flow direction.

7. A fuel cell according to claim 1, wherein one or more of the turn sections represents two essentially 90° changes (20) in flow direction, each separated by an essentially straight turn section leg TL, so as to collectively represent a 180° change of flow direction.

8. A fuel cell according to claim 7 wherein the turn section leg TL has a length of not more than 20% of the length of any of the legs.

9. A fuel cell according to claim 1, wherein each serpentine path comprises 3 legs $L_1$, $L_2$, and $L_3$; 2 wall sections, $W_1$ $W_2$ and two turn sections, $T_1$, and $T_2$.

10. A fuel cell according to claim 9, wherein the first wall section $W_1$, comprises bypass channels located at the downstream half-part of $L_1$, and wherein the second wall section $W_2$ comprises by-pass channels located at the upstream half-part of $L_2$, and wherein the wall section W2 comprises bypass channels located at the downstream half-part of $L_2$.

11. A fuel cell according to claim 9, wherein the first wall section $W_1$, comprises 10 bypass channels located at the downstream half-part of $L_1$, and wherein the second wall section $W_2$ comprises 3 bypass channels located at the upstream half-part of $L_2$, and wherein the second wall section $W_2$ comprises 5 bypass channels located at the downstream; half-part of $L_2$.

12. A fuel cell according to claim 1, wherein each serpentine path comprises 5 legs $L_1$, $L_2$, $L_3$, $L_4$ and $L_5$; 4 wall sections, $W_1$, $W_2$, $W_3$ and $W_4$; and four turn sections, $T_1$, $T_2$, $T_3$ and $T_4$.

13. A fuel cell according to claim 1, wherein one or more of said legs being essentially straight legs.

14. A fuel cell according to claim 1, wherein one or more of said legs being curved.

15. A fuel cell according to claim 1, wherein the serpentine paths are separated from each other in such a way that no one serpentine path is entangled in another serpentine path.

16. A fuel cell according to claim 1, wherein each leg has an upstream half-part and a downstream half-part, and wherein the last leg of one or more of the serpentine paths at a position corresponding to the downstream part of said leg divides into two or more branches (22) each of which extends to an edge of said cooling plate.

17. A fuel cell according to claim 1, wherein each leg has a cross section with an area of the cross section, and wherein the area of the cross section of the legs of one or more of the serpentine paths essentially are equal.

18. A fuel cell according to claim 1, wherein the widths of the each leg of one or more of the serpentine paths are essentially equal.

19. A fuel cell according to claim 1, wherein each leg has a cross section with an area of the cross section, and wherein a ratio of the area of the cross section of any of the bypass channels (16) to the area of the cross section of any of the leg independently is 0.1-1.

20. A fuel cell according to claim 1 comprising one or more distinct groups of bypass channels, wherein the spacing between individual bypass channels within each group is 1-8, times the width of the legs.

21. A fuel cell according claim 1, wherein the high temperature fuel cell is a proton exchange membrane fuel cell or a solid oxide fuel cell.

22. A fuel cell according claim 1, wherein said plate is made of a material selected from the group comprising: graphite; graphite powder comprising a binder; a metal; a metal comprising a corrosion resistant coating; an alloy; an alloy comprising a corrosion resistant coating; an electrically conducting elastomeric mixture; and an electrically conductive ceramic material.

23. A fuel cell according to claim 1, wherein the cooling plate is a bipolar plate with an anode side for hydrogen fuel and a cathode side with channels for oxidant gas, wherein the cathode side is the cooling side and the cooling fluid is the oxidant gas.

* * * * *